(12) United States Patent
Jung et al.

(10) Patent No.: US 7,904,125 B2
(45) Date of Patent: Mar. 8, 2011

(54) SLIDE MODULE FOR PORTABLE TERMINAL

(75) Inventors: Kyung-Sung Jung, Seoul (KR); Won-Seok Joo, Seoul (KR)

(73) Assignee: LG Electronics Inc., Seoul (KR)

( * ) Notice: Subject to any disclaimer, the term of this patent is extended or adjusted under 35 U.S.C. 154(b) by 1051 days.

(21) Appl. No.: 11/466,849

(22) Filed: Aug. 24, 2006

(65) Prior Publication Data

US 2007/0049356 A1 Mar. 1, 2007

(30) Foreign Application Priority Data

Aug. 26, 2005 (KR) .................. 10-2005-0079077
Aug. 26, 2005 (KR) .................. 10-2005-0079081

(51) Int. Cl.
*H04M 1/00* (2006.01)
(52) U.S. Cl. ............ 455/575.4; 455/550.1; 455/575.1
(58) Field of Classification Search ........... 455/575.4, 455/575.2, 550.1, 575.1
See application file for complete search history.

(56) References Cited

U.S. PATENT DOCUMENTS

| | | | |
|---|---|---|---|
| 7,403,612 B2 * | 7/2008 | Nishihara | 379/433.12 |
| 2004/0137940 A1 | 7/2004 | Matsunami | |
| 2005/0059438 A1 | 3/2005 | Jellicoe | |
| 2005/0091431 A1 * | 4/2005 | Olodort et al. | 710/72 |
| 2005/0104856 A1 | 5/2005 | Jacobs et al. | |
| 2005/0245251 A1 | 11/2005 | Lee et al. | |
| 2005/0255897 A1 * | 11/2005 | Lee et al. | 455/575.4 |
| 2006/0046796 A1 * | 3/2006 | Park et al. | 455/575.4 |
| 2006/0146014 A1 | 7/2006 | Lehtonen | |

FOREIGN PATENT DOCUMENTS

| | | |
|---|---|---|
| CH | 1694465 | 11/2005 |
| DE | 203 17 865 U1 | 4/2004 |
| EP | 1 499 093 A1 | 1/2005 |
| EP | 1 528 755 A1 | 5/2005 |
| EP | 1 592 209 A2 | 11/2005 |
| GB | 2 407 933 A | 5/2005 |
| JP | 59-143152 U | 9/1984 |
| JP | 2004-215180 A | 7/2004 |
| JP | 2005-341480 A | 12/2005 |
| JP | 2008-527620 A | 7/2008 |
| WO | WO 03/050665 A1 | 6/2003 |
| WO | WO 2005/034485 A2 | 4/2005 |
| WO | WO 2005/043870 A2 | 5/2005 |

OTHER PUBLICATIONS

English language Abstract of CN 1694465, Nov. 9, 2005.

* cited by examiner

*Primary Examiner* — Patrick N Edouard
*Assistant Examiner* — Justin Y Lee
(74) *Attorney, Agent, or Firm* — Birch, Stewart, Kolasch & Birch, LLP (57) ABSTRACT

A slide module of a portable terminal that provides relative sliding movement in longitudinal and transverse directions between a first body and a second body. The portable terminal includes a first body, a second body positioned facing the first body, and a slide module provided between the first body and the second body to guide the first body in sliding movement in longitudinal and transverse directions relative to the second body. The slide module includes a first slide member fixed to the first body, a second slide member fixed to the second body, and a guide unit provided between the first slide member and the second slide member to guide the first slide member in sliding movement in longitudinal and transverse directions.

7 Claims, 8 Drawing Sheets

SLIDE MODULE FOR PORTABLE TERMINAL

CROSS-REFERENCE TO RELATED APPLICATIONS

The present disclosure relates to subject matter contained in priority Korean Applications No. 10-2005-79077 and No. 10-2005-79081, both filed on Aug. 26, 2005, which are herein expressly incorporated by reference in their entireties.

BACKGROUND OF THE INVENTION

1. Field of the Invention

The present invention relates to a portable terminal having a slide module, and particularly, to a portable terminal having a slide module which may be slidingly moved in longitudinal and transverse directions.

2. Description of Related Art

Figure 1:
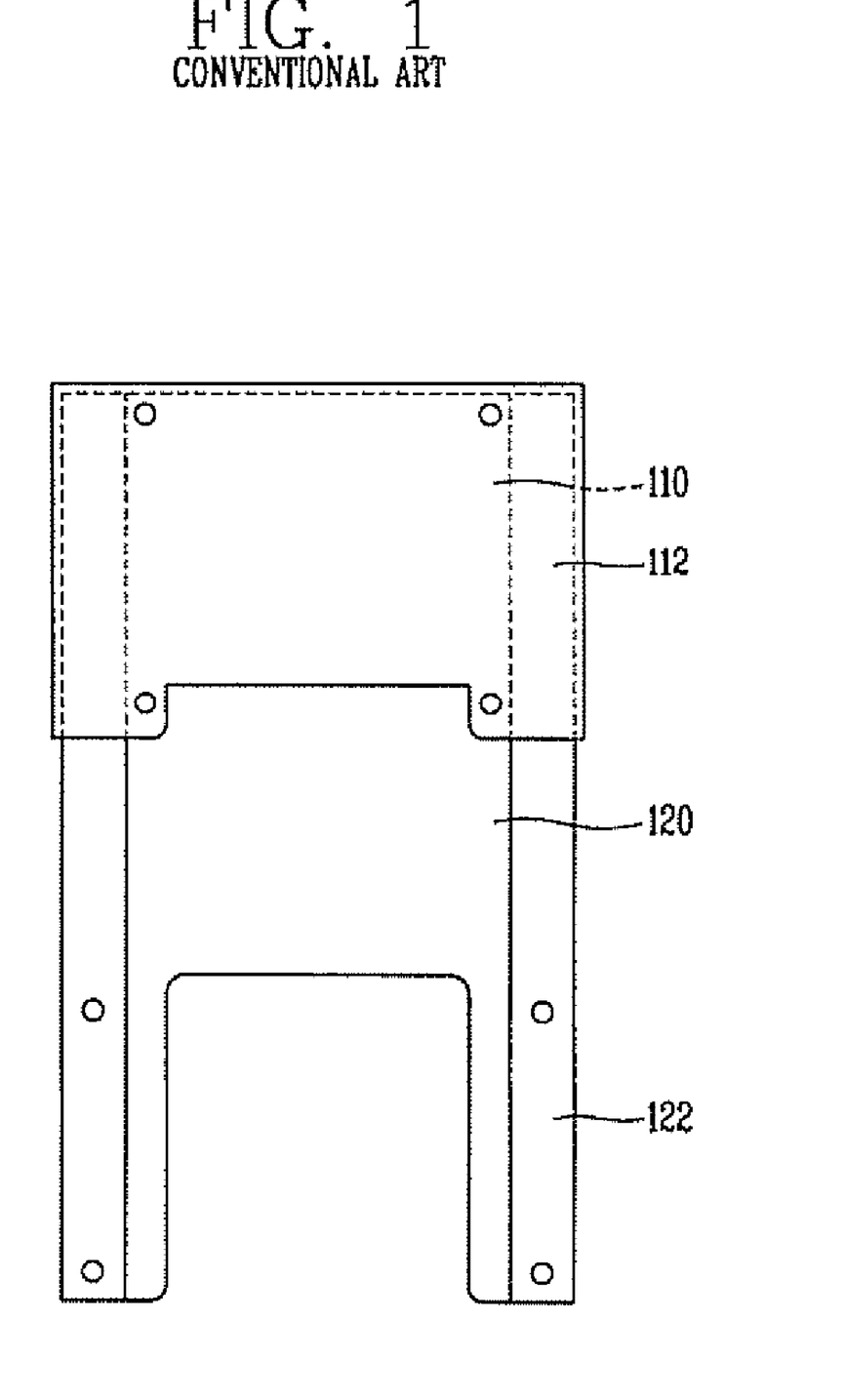
FIG. 1 is a front view illustrating a prior art slide module.

FIG. 1 is a front view illustrating a slide module of the prior art.

A slide module according to the prior art includes a first slide member 110 fixed to a first body (not shown), and a second slide member 120 fixed to a second body (not shown). The second slide member 120 is mounted to the first slide member 110 to be slidingly movable relative thereto.

First slide rails 112 are formed at both edges of the first slide member 110 along its longitudinal direction. Second slide rails 122 are formed at both edges of the second slide member 120 along its longitudinal direction and are inserted in the first slide rails 112 to be slidingly moved along the first slide rails 112.

In the slide module of the prior art having the construction described above, when the first body is moved along its longitudinal direction, the first slide member 110 connected to the first body is slidingly moved along the longitudinal direction relative to the second slide member 120.

However, in this the slide module according to the prior art, the first slide member may be slidingly moved only in the longitudinal direction, thereby failing to meet various usage requirements and presenting disadvantages.

SUMMARY OF THE INVENTION

The present invention is provided to address at least the above described problems. An object of the present invention is to provide a portable terminal having a slide module which is capable of satisfying various usage requirements of portable terminals by providing a first body which may be slidingly moved in longitudinal and transverse directions relative to a second body.

To achieve these and other advantages and in accordance with the purpose of the present invention, as embodied and broadly described herein, there is provided, an aspect of the present invention provides a slide module for a portable terminal, including a first slide member configured to be fixed to a first body of the portable terminal; a second slide member configured to be fixed to a second body of the portable terminal; and a guide unit provided between the first slide member and the second slide member to guide the first slide member in sliding movement in longitudinal and transverse directions. Further, the guide unit may include a first longitudinal rail provided on the first slide member and extending in a longitudinal direction of the first slide member; a first transverse rail provided on the first slide member and connected to the first longitudinal rail, the first transverse rail extending in a transverse direction of the first slide member; and a guide projection provided on the second slide member and supported by the first transverse rail and the first longitudinal rail to slidingly move relative to the first transverse rail and the first longitudinal rail. The guide unit may further include a second longitudinal rail provided on the second slide member and extending in a longitudinal direction of the second slide member; a second transverse rail provided on the second slide member and connected to the second longitudinal rail, the second transverse rail extending in a transverse direction of the second slide member; and a slide projection provided on the first slide member and supported by the second transverse rail and the second longitudinal rail to slidingly move relative to the second transverse rail and the second longitudinal rail. The first longitudinal rail and the second longitudinal rail may be formed at edges of the first slide member and the second slide member, respectively, the first longitudinal rail and the second longitudinal rail extending in the longitudinal direction. Further, the first longitudinal rail and the second longitudinal rail are positioned at opposite edges to each other, and the first slide member and the second slide member are arranged facing each other.

In a further aspect of the present invention, the first transverse rail and the second transverse rail are formed at edges of the first slide member and the second slide member, respectively, the first transverse rail and the second transverse rail extending in the transverse direction. Further, the first transverse rail and the second transverse rail are positioned at opposite edges to each other and the first slide member and the second slide member are arranged facing each other. The guide projection provided on the first slide member including a first guide projection and the guide projection provided on the second slide member including a second guide projection, wherein the first guide projection is mounted at a corner of the first slide member, and the second guide projection is mounted at a corner of the second slide member. Additionally, the first guide projection and the second guide projection are arranged diagonally across from each other, and the first slide member and the second slide member are arranged facing each other.

A further aspect of the present invention provides a guide unit including a first guide rail provided on the first slide member; a second guide rail provided on the second slide member; a first guide member provided on the first slide member and inserted in the second guide rail and slidingly movable relative to the second guide rail; and a second guide member provided on the second slide member and inserted in the first guide rail and slidingly movable relative to the second guide rail. The first guide rail and the second guide rail are formed on edges of the first slide member and on edges of the second slide member, respectively; and the first guide rail and the second guide rail extend substantially perpendicularly from respective corners of the first and second slide members and extend along edges of the first and second slide members, and ends of extended portions thereof are perpendicularly curved inwardly. The first guide member and the second guide member are formed on surfaces of the first slide member and the second slide member, respectively, the first guide member and the second guide member extending in the longitudinal and transverse directions, respectively. The first guide member and the second guide member project perpendicularly from surfaces of the first slide member and the second slide member, respectively, and ends of the first guide member and the second guide member are perpendicularly curved toward the edges of the first slide member and the second slide member, respectively. The first slide member includes a supporting projection to prevent movement of the first slide member in the longitudinal direction when the first slide member is moved in the transverse direction. The supporting projection is formed on the first slide member at a position spaced from the transversely extending portion of the first guide member by a predetermined distance, and arranged on a line extending substantially parallel to the transverse member of the first guide member.

A further aspect of the present invention provides a portable terminal including a first body and a second body, the first body and the second body slidingly movable relative to each other in longitudinal and transverse directions; and a slide module including a first slide member fixed to the first body of the portable terminal; a second slide member fixed to the second body of the portable terminal; and a guide unit provided between the first slide member and the second slide member to guide the first slide member and the first body in sliding movement in longitudinal and transverse directions.

The foregoing and other objects, features, aspects and advantages of the present invention will become more apparent from the following detailed description of the present invention when taken in conjunction with the accompanying drawings.

BRIEF DESCRIPTION OF THE DRAWINGS

The above, and other objects, features and advantages of the present invention will be made apparent from the following description of the preferred embodiments, given as non-limiting examples, with reference to the accompanying drawings in which.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Hereinafter, the preferred embodiments of the present invention are described with reference to the attached drawings.

Figure 2:
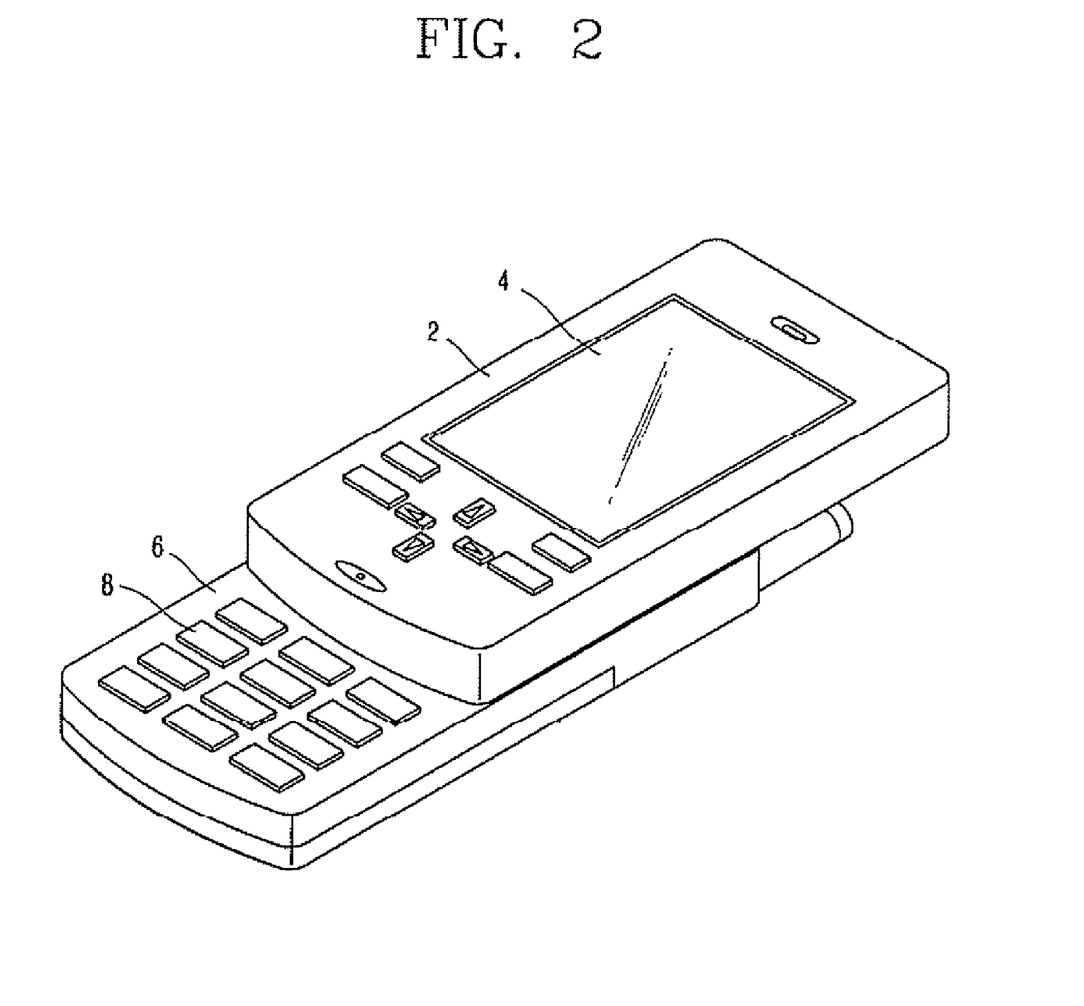
FIG. 2 is a perspective view of a portable terminal according to a first embodiment of the present invention, illustrating a state in which the portable terminal is open in a longitudinal direction.
Figure 3:
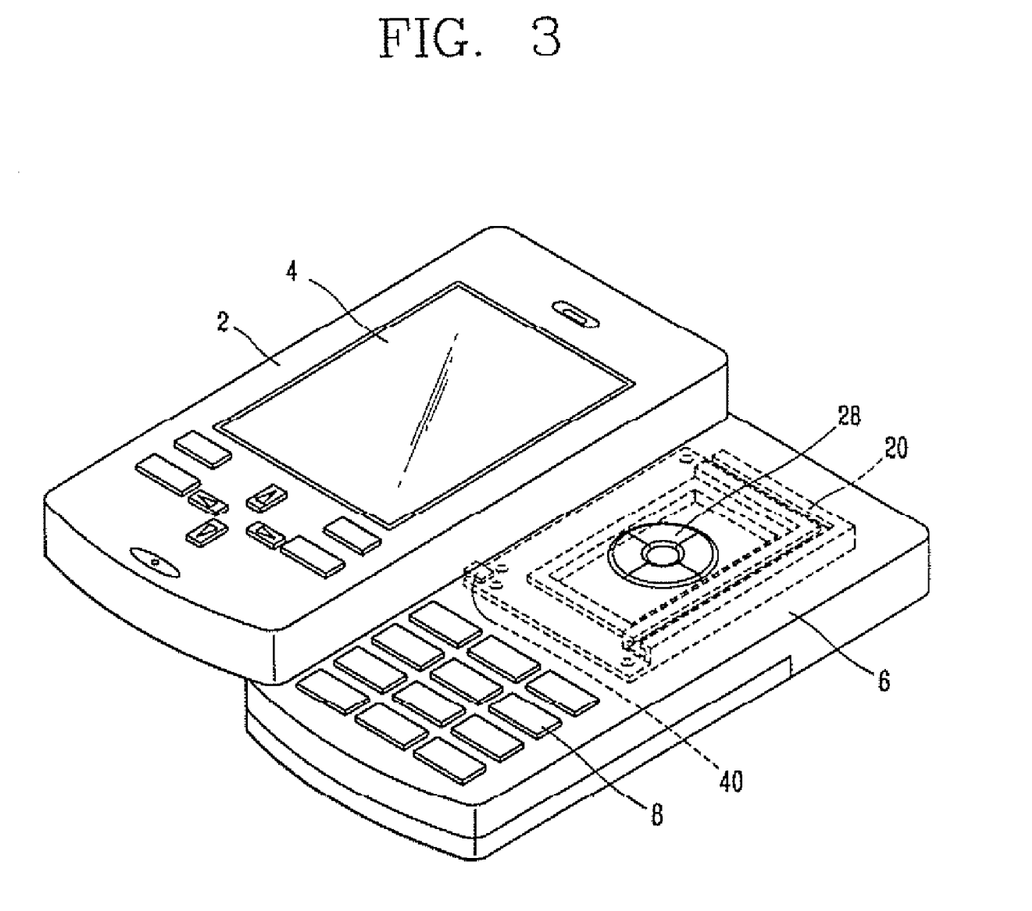
FIG. 3 is a perspective view of the portable terminal according to the embodiment of FIG. 2, illustrating a state in which the portable terminal is open in a transverse direction.
Figure 4:
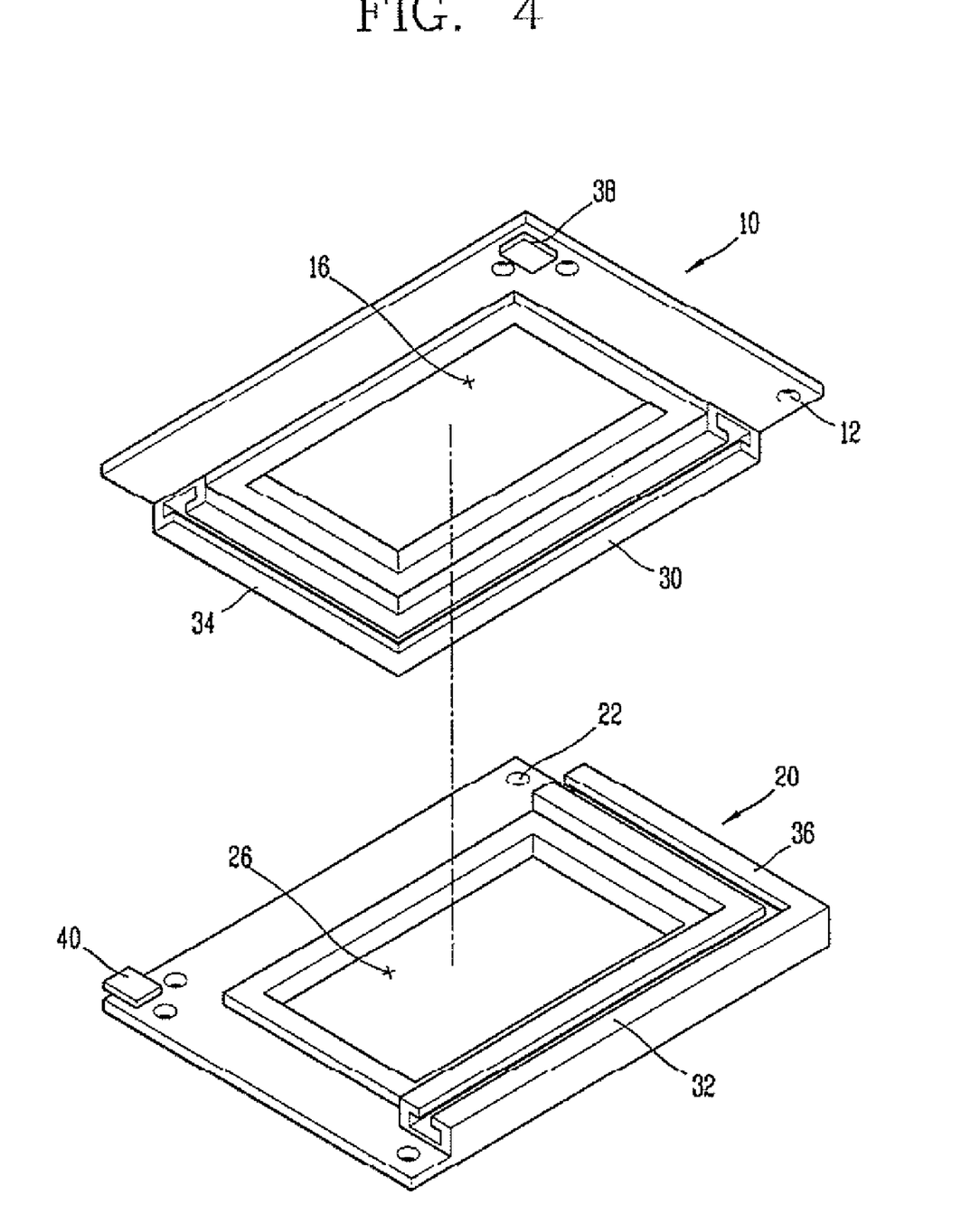
FIG. 4 is an exploded perspective view of the slide module according to the embodiment of FIG. 2, in which the first slide member and the second slide member are depicted rotated relative to each other for ease of viewing.

FIG. 2 is a perspective view of a portable terminal according to a first embodiment of the present invention, illustrating a state in which the portable terminal is open in a longitudinal or vertical direction. FIG. 3 is a perspective view of the portable terminal according to the first embodiment of the present invention, illustrating a state in which the portable terminal is open in a transverse or horizontal direction. FIG. 4 is an exploded perspective view of the slide module according to the first embodiment of the present invention.

A portable terminal according to the first embodiment of the present invention may include a first body 2 having a display 4, a second body 6 connected to the first body 2 and slidingly movable longitudinally and transversely relative to the first body 2, a keypad 8 on the second body 6, and a slide module provided between the first body 2 and the second body 6 to guide the first body 2 in sliding movement in longitudinal and transverse directions relative to the second body 6.

The slide module includes a first slide member 10 fixed to the first body 2, a second slide member 20 fixed to the second body 6, and a guide unit formed between the first slide member 10 and the second slide member 20. The guide unit guides the first slide member 10 in sliding movement in a transverse or horizontal direction with respect to the second slide member 20, and also guides the first slide member 10 in sliding movement in a longitudinal or vertical direction with respect to the second slide member 20.

The first slide member 10 is formed in a substantially planar shape. The first slide member 10 is coupled to the first body 2 by any suitable fastening device, and in the present embodiment, the first slide member 10 is coupled to the first body 2 by bolts inserted through coupling holes. For example, bolt coupling holes 12 to couple the first slide member 10 to the first body 2 with bolts may be formed in the edges of the first slide member 10. The bolt coupling holes 12 allow the first slide member 10 to be mounted on a rear surface of the first body 2. An aperture 16 is formed through the center of the first slide member 10.

The second slide member 20 is formed in a substantially planar shape, and is arranged in a position facing the first slide member 10. The second slide member 20 is coupled to the second body 6 by any suitable fastening device, and in the present embodiment, the second slide member 20 is coupled to the second body 6 by bolts inserted through coupling holes. For example, bolt coupling holes 22 to couple the second slide member 20 to the second body 6 are formed in the edges of the second slide member 20. The bolt coupling holes 22 allow the second slide member 20 to be mounted on a front surface of the second body 6. An aperture 26 is formed through the center of the second slide member 20.

With the second slide member 20 mounted on the front surface of the second body 6, components may be provided in the aperture 26. For example, components such as keys 28 for inputting information, a display, or like component may be provided in the aperture 26.

The guide unit may include rails to provide relative longitudinal and transverse sliding movement between the first slide member 10 and the second slide member 20. Longitudinal or vertical rails 30 and 32 are formed on the first slide member 10 and the second slide member 20, respectively, extending in the longitudinal direction. Transverse or horizontal rails 34 and 36 connect to the longitudinal rails 30 and 32 and are formed on the first slide member 10 and the second slide member 20, respectively, extending in the transverse direction. Guide projections 38 and 40 are provided on the first slide member 10 the second slide member 20, respectively. The guide projection 38 is supported by the longitudinal rail 30 and the transverse rail 34 so as to be slidingly movable along the longitudinal rail 30 and the transverse rail 34. The guide projection 40 is supported by the longitudinal rail 32 and the transverse rail 36 so as to be slidingly movable along the longitudinal rail 32 and the transverse rail 36. The longitudinal rails 30, 32, the transverse rails 34, 36, and the guide projections 38, 40 may be formed in any suitable manner. For example, the longitudinal rail 30, the transverse rail 34, and the guide projection 38 may be formed integrally and in one piece with the first slide member 10, or may be separately formed and mounted to the first slide member 10 by a suitable fastening device. Further, the longitudinal rail 32, the transverse rail 36, and the guide projection 40 may be formed integrally and in one piece with the second slide member 20, or may be separately formed and mounted to the second slide member 20 by a suitable fastening device. The first longitudinal rail 30 is positioned at an edge of one side of the first slide member 10 and extends along the longitudinal direction. The second longitudinal rail 32 is positioned at an edge of one side of the second slide member 20 and extends along the longitudinal direction.

When the first slide member 10 and the second slide member 20 are arranged facing each other, the first longitudinal rail 30 and the second longitudinal rail 32 are positioned at opposite edges of the guide unit.

Each of the longitudinal rails 30 and 32 has a width and interior space size such that the respective guide projections 38 and 40 can be inserted therein for sliding movement. Each longitudinal rail 30, 32 extends perpendicularly to its width and in the longitudinal direction to a predetermined length and thereafter the end portions of the longitudinal rails 30, 32 curve inwardly. Accordingly, each of the guide projections 38 and 40 is prevented from being separated from its respective longitudinal rail 30, 32.

The first transverse rail 34 is positioned at an edge of the first slide member 10 and extends along the transverse direction. The second transverse rail 36 is positioned at an edge of the second slide member 20 and extends along the transverse direction.

When the first slide member 10 and the second slide member 20 are arranged facing each other, the first transverse rail 34 and the second transverse rail 36 are positioned at opposite edges of the guide unit.

The first transverse rail 34 and the second transverse rail 36 extend in a transverse direction from the first longitudinal rail 30 and the second longitudinal rail 32, respectively. Further, the first transverse rail 34 and the second transverse rail 36 have substantially the same shape as those of the first longitudinal rail 30 and the second longitudinal rail 32, respectively. In this regard, each of the transverse rails 34, 36 has a width and interior space size such that the respective guide projections 38 and 40 can be inserted therein for sliding movement. Each transverse rail 34, 36 extends perpendicularly to its width and in the transverse direction to a predetermined length and thereafter the end portions of the transverse rails 34, 36 curve inwardly. Accordingly, each of the guide projections 38 and 40 is prevented from being separated from its respective transverse rail 34, 36.

The first guide projection 38 projects from a corner of the first slide member 10 and is supported by the second longitudinal rail 32 and the second transverse rail 36 formed on the second slide member 20 so as to be slidingly movable relative to the second longitudinal rail 32 and the second transverse rail 36. The second guide projection 40 projects from a corner of the second slide member 20 and is supported by the first longitudinal rail 30 and the first transverse rail 34 formed on the first slide member 10 so as to be slidingly movable relative to the first longitudinal rail 30 and the first transverse rail 34.

When the first slide member 10 and the second slide member 20 are arranged facing each other, the first guide projection 38 and the second guide projection 40 are positioned at opposite corners of the guide unit diagonally across from each other.

Each guide projection 38 and 40 is formed in a substantially rectangular shape. Accordingly, each guide projection 38, 40 includes a first pair of substantially parallel side surfaces extending in the longitudinal direction and a second pair of substantially parallel side surfaces extending in the transverse direction. Therefore, when the guide projection 38 and the guide projection 40 are inserted in respective longitudinal rails 30 and 32 and respective transverse rails 34 and 36 to be slidingly moved, the guide projections 38 and 40 are slidingly moved in a state such that the first pair of side surfaces contact both inner walls of the longitudinal rails 30, 32, respectively, during longitudinal sliding movement, and the second pair of side surfaces contact both inner walls of the transverse rails 34, 36, respectively, during transverse sliding movement. Accordingly, the guide projections 38, 40 slide smoothly along the respective longitudinal rails 30, 32 and transverse rails 34, 36, and the guide projections 38, 40 are maintained in alignment within the respective longitudinal rails 30, 32 and transverse rails 34, 36. The first slide member 10 and the second slide member 20 are prevented from being misaligned relative to each other.

The operation of the slide module in accordance with the first embodiment of the present invention will now be explained.

Figure 5:
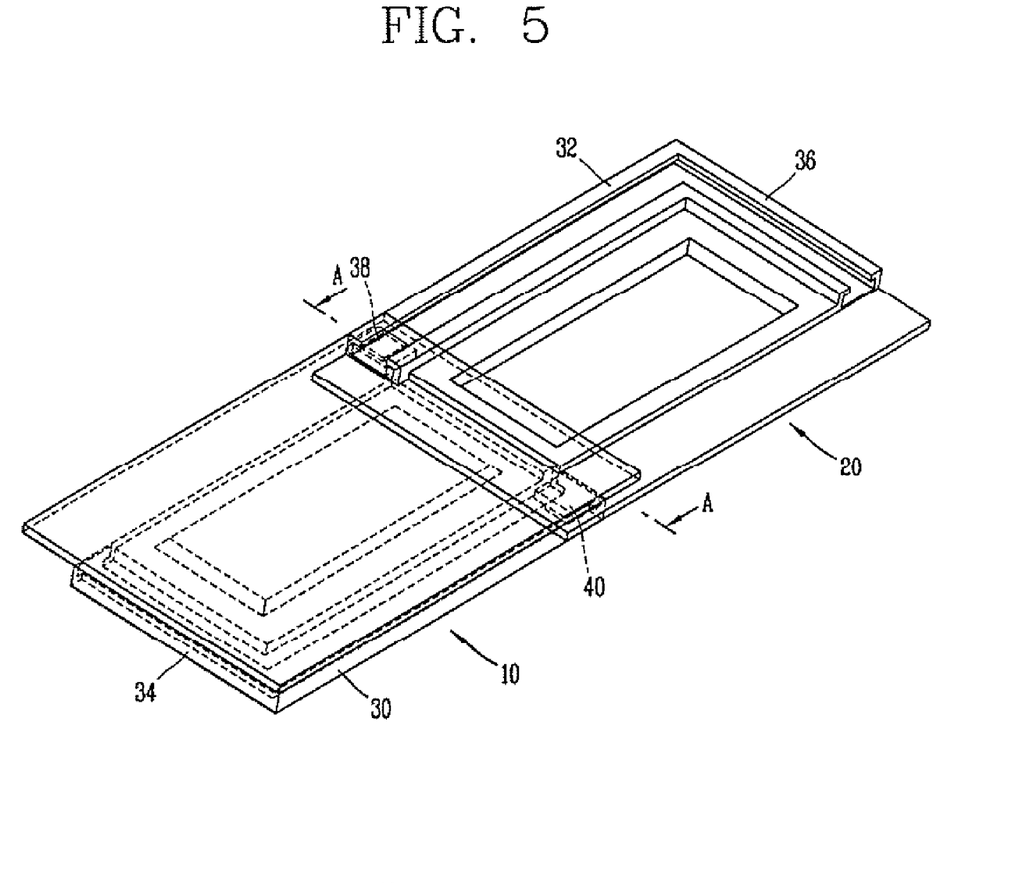
FIG. 5 is a perspective view of the slide module according to the embodiment of FIG. 2, illustrating a state in which the slide module has been moved in the longitudinal direction.
Figure 6:
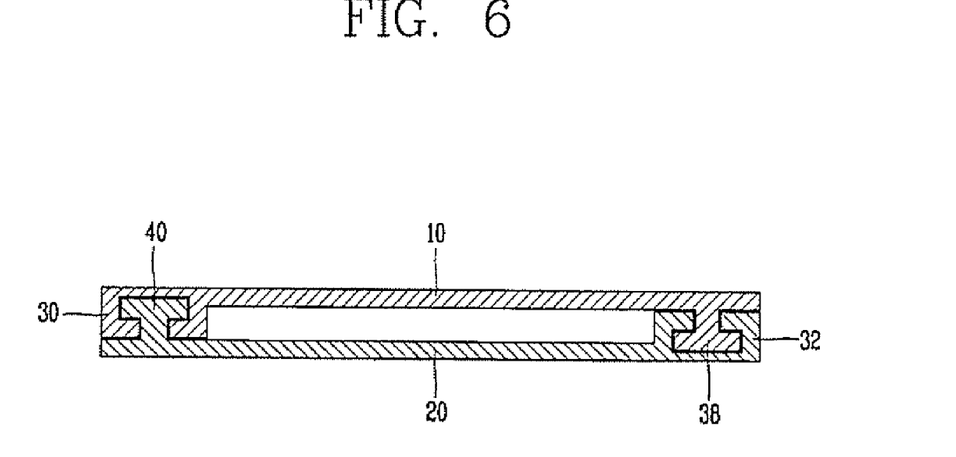
FIG. 6 is a sectional view taken along the line A-A of FIG. 5.
Figure 7:
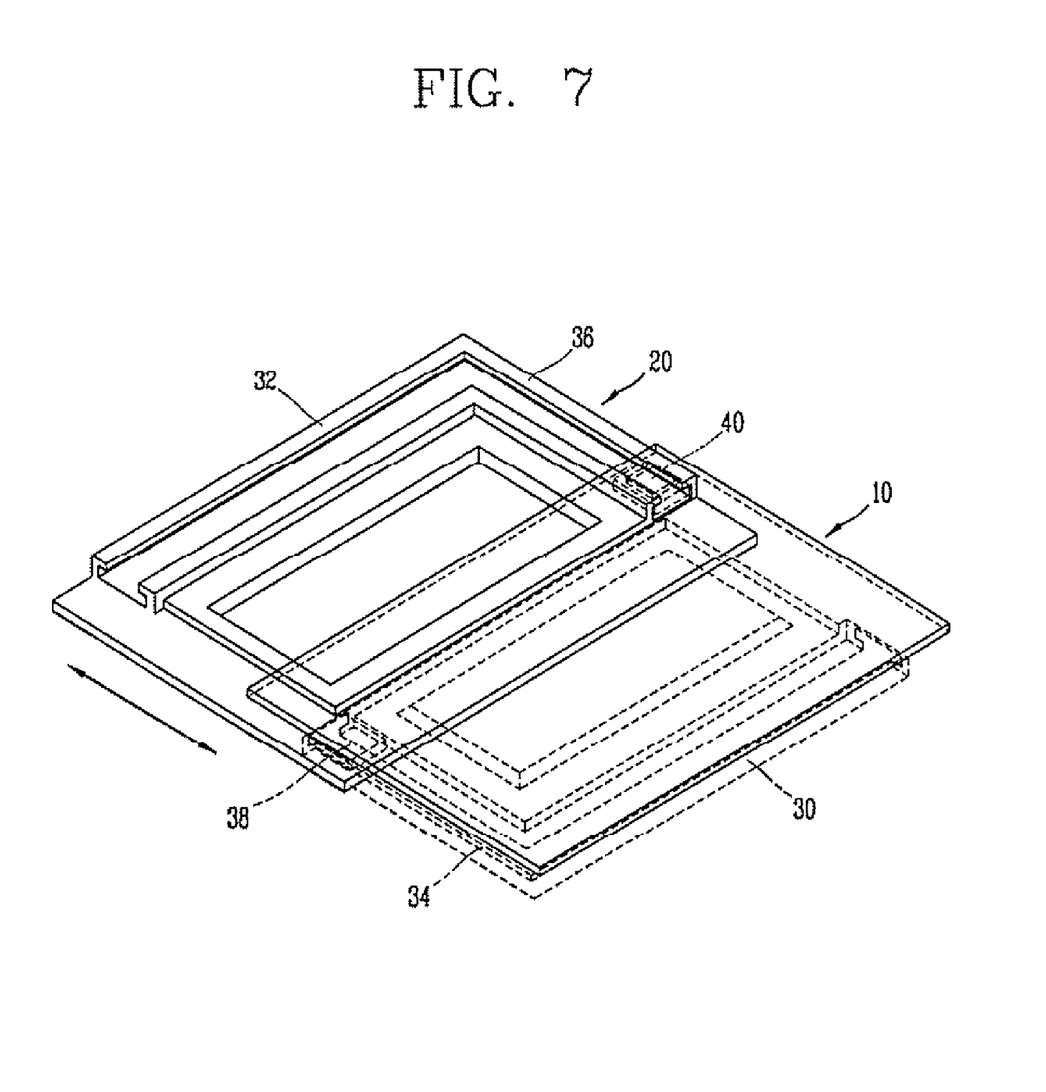
FIG. 7 is a perspective view of the slide module according to the embodiment of FIG. 2, illustrating a state in which the slide module has been moved in the transverse direction.

FIG. 5 is a perspective view of the slide module according to the first embodiment of the present invention, illustrating a state in which the slide module has been moved in the longitudinal direction. FIG. 6 is a sectional view taken along the line A-A of FIG. 5. FIG. 7 is a perspective view of the slide module according to the first embodiment of the present invention, illustrating a state in which the slide module has been moved in the transverse direction.

The slide module assembly process includes assembling the first and second slide members 10 and 20 so that the second guide projection 40 formed on the second slide member 20 is supported by the first longitudinal rail 30 and the first transverse rail 34 formed on the first slide member 10 so as to be slidingly movable in the longitudinal and transverse directions. The first guide projection 38 formed on the first slide member 10 is supported by the second transverse rail 36 and the second longitudinal rail 32 formed on the second slide member 20 so as to be slidingly movable in the longitudinal and transverse directions. Accordingly, the first slide member 10 and the second slide member 20 are connected to each other in the longitudinal direction and the transverse direction so as to be slidingly movable in the longitudinal and transverse directions.

In this assembled state, when the first slide member 10 slides in the longitudinal direction with respect to the second slide member 20, the second guide projection 40 is slidingly moved along the first longitudinal rail 30 and the first guide projection 38 is slidingly moved along the second longitudinal rail 32, so as to guide the sliding movement of the first slide member 10 in the longitudinal direction.

When the first slide member 10 slides in the transverse direction with respect to the second slide member 20, the second guide projection 40 is slidingly moved along the first transverse rail 34 and the first guide projection 38 is slidingly moved along the second transverse rail 36, so as to guide the sliding movement of the first slide member 10 in the transverse direction.

Thus, the guide unit including with the pair of guide projections 38 and 40 allows the first slide member 10 to be slidingly moved more safely and accurately.

Figure 8:
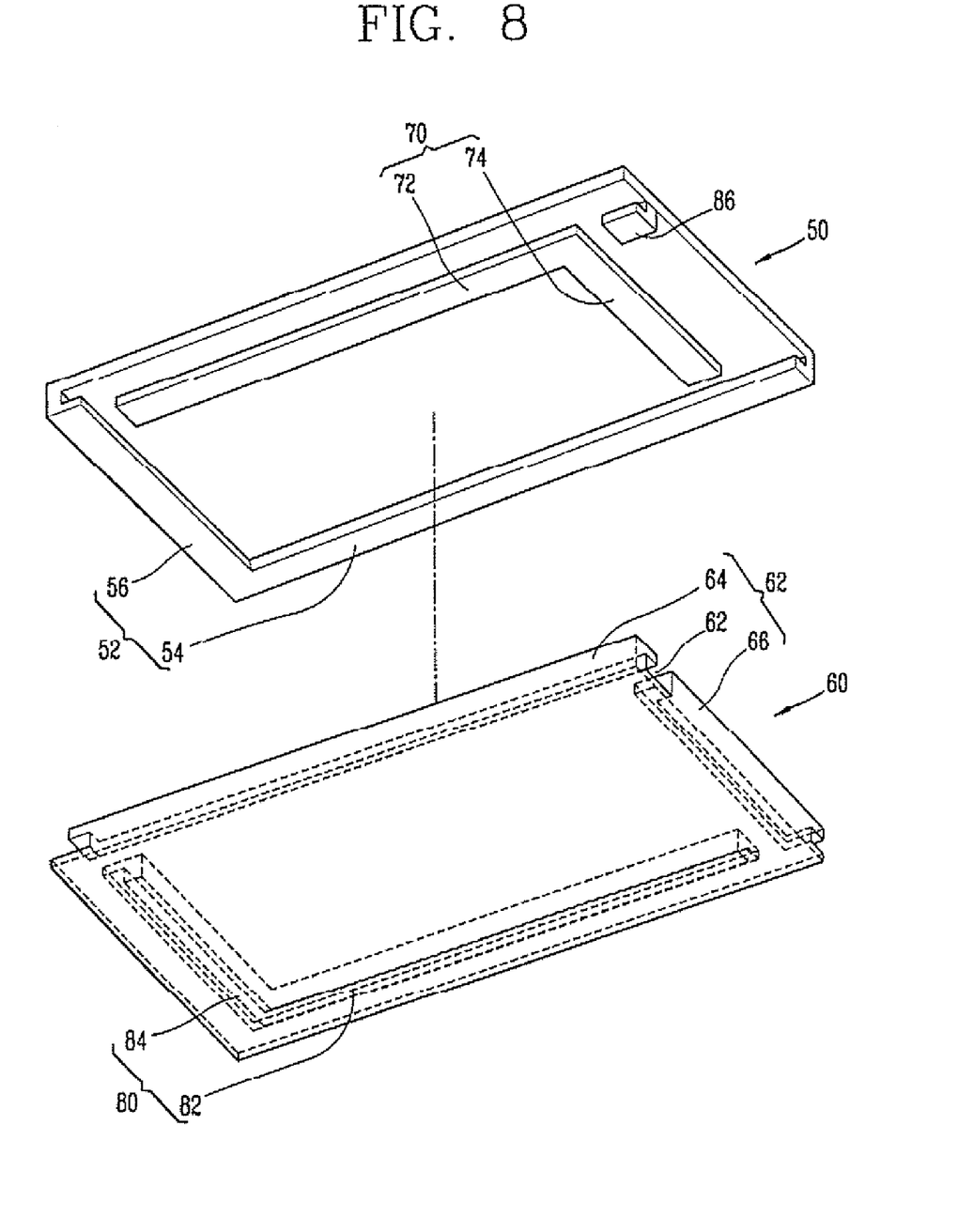
FIG. 8 is an exploded perspective view of a slide module according to a second embodiment of the present invention.

FIG. 8 is an exploded perspective view illustrating a slide module in accordance with a second embodiment of the present invention.

A slide module according to a second embodiment of the present invention may include a first slide member 50 fixed to the first body 2, a second slide member 60 fixed to the second body 6, and a guide unit disposed between the first slide member 50 and the second slide member 60 to guide the first slide member 50 in sliding movement in a longitudinal direction with respect to the second slide member 60 and to guide the first slide member 50 in sliding movement in a transverse direction with respect to the second slide member 60.

The guide unit of the second embodiment of the present invention may include a first guide rail 52 formed on the first slide member 50, a second guide rail 62 formed on the second slide member 60, a first guide member 70 formed on the first slide member 50 and inserted in the second guide rail 62 so as to be slidingly movable relative thereto, and a second guide member 80 formed on the second slide member 60 and inserted in the first guide rail 52 so as to be slidingly movable relative thereto.

The first guide rail 52 includes a transverse rail 56 formed at an edge of the first slide member 50 in its transverse direction, and a longitudinal rail 54 extending in the longitudinal direction from one end of the transverse rail 54 and formed at an edge of the first slide member 50 in its longitudinal direction.

The transverse rail 56 and the longitudinal rail 54 of the first guide rail 52 extend perpendicularly to each other from the corner and along the edges of the first slide member 50 so that the transverse rail 56 and the longitudinal rail 54 each have a predetermined length. The ends of the transverse rail 56 and the longitudinal 54, are perpendicularly curved inwardly in an inner direction.

The second guide rail 62 includes a transverse rail 66 formed at an edge of the second slide member 60 in its transverse direction, and a longitudinal rail 64 formed at an edge of the second slide member 60 in its longitudinal direction. The second guide rail 62 has the same shape as that of the first guide rail 52. Thus, the transverse rail 66 and the longitudinal rail 64 of the second guide rail 62 extend perpendicularly to each other from the corner and along the edges of the second slide member 60 so that the transverse rail 66 and the longitudinal rail 64 each have a predetermined length. The ends of the transverse rail 66 and the longitudinal rail 64 are perpendicularly curved inwardly in an inner direction.

The first guide member 70 has a substantially perpendicular shape and projects from a surface of the first slide member 50. The ends of the projecting portion of the first guide member 70 are perpendicularly curved in a direction of the edge of the first slide member 50.

The first guide member 70 includes a transverse member 74 extending in a transverse direction of the first slide member 50, and a longitudinal member 72 extending perpendicularly from one end of the transverse member 74 and extending in a longitudinal direction of the first slide member 50.

The second guide member 80 includes a transverse member 84 extending in a transverse direction of the second slide member 60, and a longitudinal member 82 extending perpendicularly from one end of the transverse member 84 and extending in a longitudinal direction of the second slide member 60.

The second guide member 80 has the same shape as that of the first guide member 70. In this regard, the second guide member 80 has a substantially perpendicular shape and projects from a surface of the second slide member 60. The ends of the projecting portion of the second guide member 80 are perpendicularly curved in a direction of the edge of the second guide member 80. Additionally, the curved points of the first and second guide members 70 and 80 are arranged facing each other diagonally across the slide member.

The first slide member 50 includes a supporting projection 86 that prevents the first slide member 50 from moving in the longitudinal direction when the first slide member 50 is moved in the transverse direction.

The supporting projection 86 projects from a portion longitudinally spaced apart from the longitudinal member 72 of the first slide member 50 by a predetermined distance. Accordingly, when the first slide member 50 is slidingly moved in the longitudinal direction, the supporting projection 86 contacts an outer surface of the transverse rail 66 of the second slide member 60 to thus prevent the second slide member 60 from being moved in the longitudinal direction.

The supporting projection 86 is arranged along the same straight line along which the longitudinal member 72 of the first slide member 50 extends.

A path is formed in the transverse rail 66 of the second slide member 60 such that the supporting projection 86 passes through the path when the first slide member 50 is slidingly moved in the longitudinal direction.

Operation of the slide module in accordance with the second embodiment of the present invention will now be explained.

Figure 9:
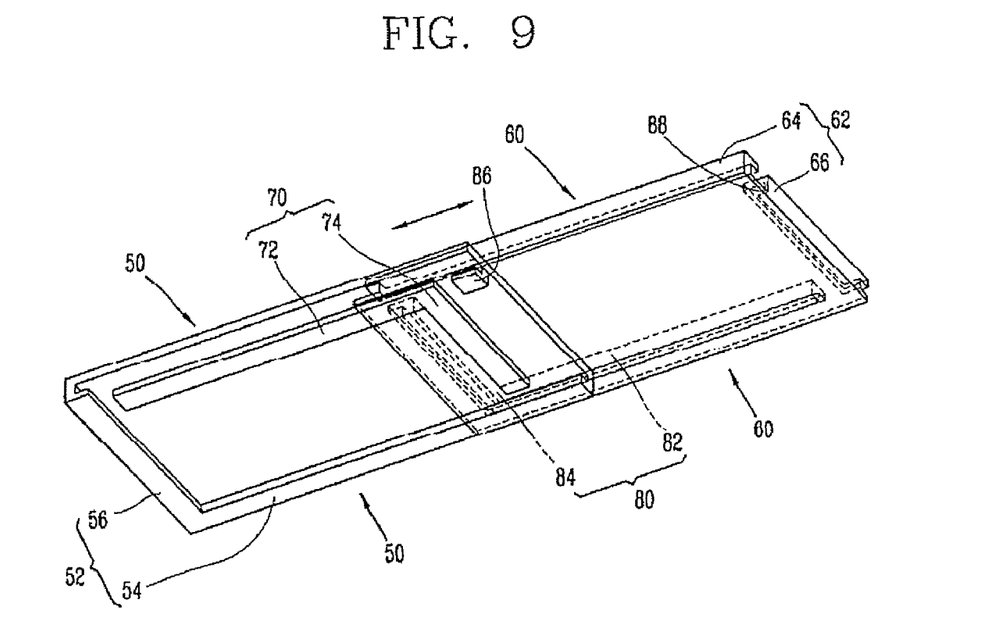
FIG. 9 is a perspective view of the slide module according to the embodiment of FIG. 8, illustrating a state in which the slide module has been moved in the longitudinal direction.
Figure 10:
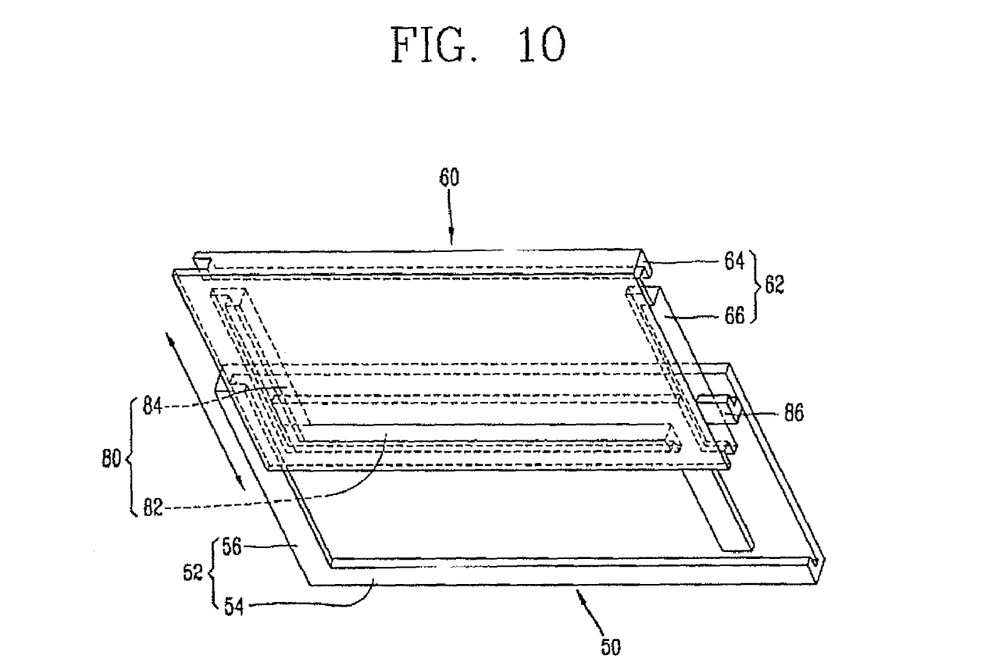
FIG. 10 is a perspective view of the slide module according to the embodiment of FIG. 8, illustrating a state in which the slide module has been moved in the transverse direction.

FIG. 9 is a perspective view illustrating a state in which the slide module of the second embodiment has been moved in a longitudinal direction. FIG. 10 is a perspective view illustrating a state in which the slide module of the second embodiment has been moved in a transverse direction.

First, when the first slide member 50 is moved in the longitudinal direction relative to the second slide member 60, the longitudinal rail 54 of the first guide rail 52 is slidingly moved while supported by the longitudinal member 82 of the second guide member 80, and the longitudinal rail 64 of the second guide rail 62 is slidingly moved while supported by the longitudinal member 72 of the first guide member 70. Accordingly, the first slide member 50 is guided to be slidingly moved in the longitudinal direction.

When the first slide member 50 is moved in the transverse direction relative to the second slide member 60, the transverse 56 of the first guide rail 52 is slidingly moved along the transverse member 84 of the second guide member 80, and the transverse member 74 of the first guide member 70 is slidingly moved along the transverse rail 66 of the second guide rail 62. The supporting projection 86 is supported by an outer surface of the transverse rail 66 of the second slide member 60, and thereby prevents the second slide member 60 from moving in the longitudinal direction. Accordingly, the first slide member 50 is guided to be moved in the transverse direction.

As described above, the slide module according to the present invention is provided with the guide unit between the first and second slide members to guide the first slide member to move in the transverse and longitudinal directions, whereby the first body of the terminal can be moved in the transverse and longitudinal directions, resulting in improvements in portable terminals in widening the range of applications and uses of portable terminals.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

Finally, it will be understood by those skilled in the art that the foregoing description is of preferred embodiments of the device, and that various changes and modifications may be made to the present invention without departing from the spirit and scope thereof.

Although the embodiments of the present invention have been described herein with reference to the accompanying drawings, many modifications and changes may be made by those skilled in the art without departing from the scope of so the invention.

It is further noted that the foregoing examples have been provided merely for the purpose of explanation and are in no way to be construed as limiting of the present invention. While the present invention has been described with reference to a preferred embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials, and embodiments, the present invention is not intended to be limited to the particulars disclosed herein, rather the present invention extends to all functionally equivalent structure, methods, and uses, such as are within the scope of the appended claims.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

Although the invention has been described with reference to several exemplary embodiments, it is understood that the words that have been used are words of description and illustration, rather than words of limitation. As the present invention may be embodied in several forms without departing from the spirit or essential characteristics thereof, it should also be understood that the above described embodiments are not limited by any of the details of the foregoing description, unless other specified. Rather, the above described embodiments should be construed broadly within the spirit and scope of the present invention as defined in the appended claims. Therefore, changes my be made within the metes and bounds of the appended claims, as presently stated and as amended, without departing from the scope and spirit of the invention in its aspects.

What is claimed is:

1. A slide module for a portable terminal, said slide module comprising:
    a first slide member configured to be fixed to a first body of the portable terminal;
    a second slide member configured to be fixed to a second body of the portable terminal; and
    a guide unit provided between said first slide member and said second slide member to guide said first slide member to perform a sliding movement in longitudinal and transverse directions, said guide unit comprises:
        a first guide rail provided on said first slide member;
        a second guide rail provided on said second slide member;
        a first guide member formed on a surface of said first slide member, inserted in said second guide rail to be slidably movable relative to said second guide rail, and extending in the longitudinal and transverse directions; and
        a second guide member formed on a surface of said second slide member, inserted in said first guide rail to be slidably movable relative to said second guide rail, and extending in the longitudinal and transverse directions,
        wherein each of said first and second guide rails extend perpendicularly from a corresponding corner of said first and second slide members, respectively,
        wherein said first and second guide rails have openings enabling said second and first guide members to move, respectively, when the first slide member slides relative to the second slide member, and
        wherein the openings are formed to face a center of the guide unit.

2. The slide module of claim 1, wherein said first guide rail and said second guide rail are formed on edges of said first slide member and on edges of said second slide member, respectively.

3. The slide module of claim 1, wherein said first guide rail and said second guide rail extend substantially perpendicularly from respective corners of said first and second slide members and extend along edges of said first and second slide members, and ends of extended portions thereof are perpendicularly curved inwardly.

4. The slide module of claim 1, wherein said first guide member and said second guide member project perpendicularly from surfaces of said first slide member and said second slide member, respectively, and ends of said first guide member and said second guide member are perpendicularly curved toward the edges of said first slide member and said second slide member, respectively.

5. The slide module of claim 1, wherein said first slide member includes a supporting projection to prevent movement of said first slide member in the longitudinal direction when said first slide member is moved in the transverse direction.

6. The slide module of claim 5, wherein said supporting projection is formed on said first slide member at a position spaced from the transversely extending portion of the first guide member by a predetermined distance, and arranged on a line extending substantially parallel to the transverse member of said first guide member.

7. A portable terminal comprising:
a first body and a second body slidably movable relative to each other in longitudinal and transverse directions; and
a slide module comprising:
   a first slide member fixed to said first body of said portable terminal;
   a second slide member fixed to said second body of said portable terminal; and
   a guide unit provided between said first slide member and said second slide member to guide said first slide member and said first body to perform a sliding movement in longitudinal and transverse directions, said guide unit comprising:
      a first guide rail provided on said first slide member,
      a second guide rail provided on said second slide member;
      a first guide member formed on a surface of said first slide member, inserted in said second guide rail to be slidably movable relative to said second guide rail, and extending in the longitudinal and transverse directions; and
a second guide member formed on a surface of said second slide member, inserted in said first guide rail to be slidably movable relative to said second guide rail, and extending in the longitudinal and transverse directions,
wherein each of said first and second guide rails extends perpendicularly from a corresponding corner of said first and second slide members, respectively,
wherein said first and second guide rails have openings enabling said second and first guide members to move, respectively when the first slide member slides relative to the second slide member, and
wherein openings are formed to face a center of the guide unit.

* * * * *